Figure 1:
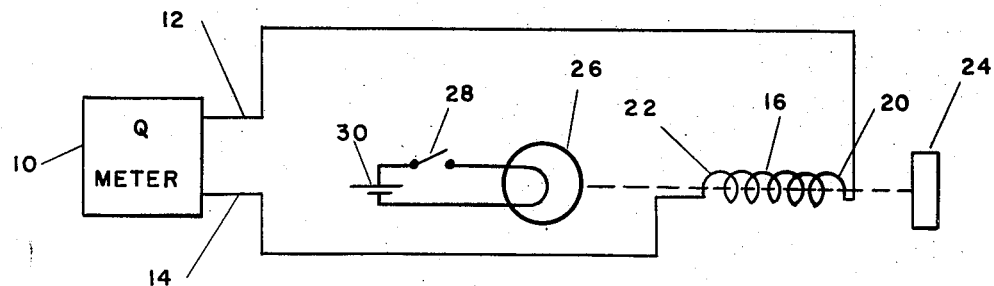

Nov. 4, 1958     H. K. HENISCH     2,859,407
METHOD AND DEVICE FOR MEASURING SEMICONDUCTOR PARAMETERS
Filed March 27, 1956

*INVENTOR.*
HEINZ K. HENISCH
BY ATTORNEY

United States Patent Office 2,859,407
Patented Nov. 4, 1958

2,859,407

METHOD AND DEVICE FOR MEASURING SEMICONDUCTOR PARAMETERS

Heinz K. Henisch, Flushing, N. Y., assignor to Sylvania Electric Products Inc., a corporation of Massachusetts Application March 27, 1956, Serial No. 574,201

2 Claims. (Cl. 324—158)

My invention is directed to both methods and devices for measuring certain semiconductor parameters.

In the semiconductor art, it is often necessary to measure the resistivity of ingots and single crystals formed from semiconducting materials (for example germanium and silicon). Conventional resistivity measurements of this type are made by securing suitable metal contacts to selected points on a semiconductor specimen and passing currents therethrough. This process is tedious and time consuming. Moreover, the resistivity measurements are taken only about these selected points; it is not possible to measure the resistivity at a variety of discrete regions on a semiconductor surface without utilizing additional contacts.

I have invented a method for measuring the resistivity of a semiconductor specimen which does not make use of attached metal contacts and further have invented a device for carrying out this method. By appropriate modification both of the method and the device, I am also able to evaluate minority carrier bulk lifetime of a semiconductor specimen at all points along a surface thereof, a measurement heretofore unobtainable in the art.

Accordingly, it is an object of the present invention to improve methods of measuring the resistivity of a semiconductor specimen in such manner as to avoid the use of metallic contacts secured to the specimen.

Another object of the present invention is to improve apparatus adapted to measure the resistivity of a semiconductor specimen in such manner as to avoid the use of a metal contact secured to the specimen.

Still another object is to provide a new and improved device for measuring the resistivity of a semiconductor specimen.

A further object is to establish a method for measuring the minority carrier lifetime of a semiconductor specimen.

Yet a further object is to improve devices for measuring semiconductor parameters in such manner as to permit an evaluation of the minority carrier lifetime of a semiconductor specimen.

Still a further object is to provide a method for rapidly measuring the resistivity and minority carrier lifetime at all points along a surface of a semiconductor specimen.

These and other objects of my invention will either be explained or will become aparent hereinafter.

In my invention there is provided a hollow coil having a predetermined value of Q and coupled to a Q-meter. The Q of any coil is the ratio for a specified frequency of the inductive impedance of the coil to the resistance of the coil. A Q-meter is a device for measuring the Q of a coil. The meter conventionally comprises an oscillator having an adjustable frequency and a vacuum tube voltmeter having a scale calibrated in values of Q. A series circuit comprising the coil and a variable capacitor is connected across the oscillator, and the voltmeter is coupled across the capacitor. The capacitor is adjusted to cause the series circuit to resonate at the selected frequency. The oscillator frequency is then adjusted to the same frequency. The power level of the oscillator is adjusted until the meter indicates some convenient Q value, as for example 141. The oscillator is then detuned until its output power is halved (this corresponds to a Q reading of 100). Then the Q of the coil can be directly computed by dividing the selected frequency by a quantity equal to twice the incremental oscillator frequency (the difference between the selected frequency and the detuned frequency).

When a portion of a semiconductor specimen is moved into close proximity to (but not in contact with) one end of the coil, the Q of the coil will change and attain a value differing from the predetermined value. This change in Q after restoring coil resonance at the same frequency is a measure of the electrical conductivity of the semiconductor portion. Since electrical resistivity and electrical conductivity are reciprocal functions, the Q-meter can be so calibrated as to measure electrical resistivity.

In order to measure the minority carrier lifetime of a semiconductor specimen, I further provide a radiation source, such as a light source, adapted to be selectively energized and deenergized when this source is energized; the radiation thus produced is transmitted axially through the coil and illuminates the said portion of the semiconductor body. As described in more detail below, it will be found that the Q of the coil will attain one value when the source is deenergized and will attain a second value when the source is energized. The difference between these two Q-values at resonance is a measure of the minority carrier bulk lifetime.

Thus, by sequentially positioning adjacent portions of the semiconductor specimen in close proximity to one end of the coil, the above described semiconductor parameters can be evaluated for each portion in turn, and the data thus obtained can be plotted or recorded in graphical form. Thus, in any semiconductor specimen, the incremental changes in these semiconductor parameters between any two or more points on the specimen can be measured in this manner.

In order to explain how minority carrier bulk lifetime is measured in this fashion, it is necesary to consider the behavior of a semiconductor specimen when subject to incident radiation. When the semiconductor is illuminated by radiation, additional charge minority carriers are produced in the material and the presence of these carriers results in a change in the electrical conductivity (and hence the electrical resistivity) of these specimens. These minority carriers are continuously recombining with oppositely charged carriers in the specimen, at which point they have no further effect on conductivity. The average interval between the instant an additional minority carrier is generated and the instant it recombines is evaluated by a quantity known as the carrier lifetime.

The carrier lifetime in general depends upon two processes: recombination in the interior of the specimen (bulk recombination) and carrier recombination at the surface or surfaces thereof (surface recombination). By adopting a standard and uniform surface treatment for any given semiconductor material, the rate of surface recombination of a semiconductor of given material, when all specimens thereof are subjected to a radiation of fixed intensity and frequency, can be held constant. In this situation, when a portion of a semiconductor specimen is placed in close proximity with an end of the coil, the Q of the coil will attain one value when the source is electrically energized and will attain another and different value when the source is deenergized. The difference in these Q values is a measure of the change in conductivity produced by the change in illumination and can be correlated with the minority carrier bulk lifetime.

Figure 2:
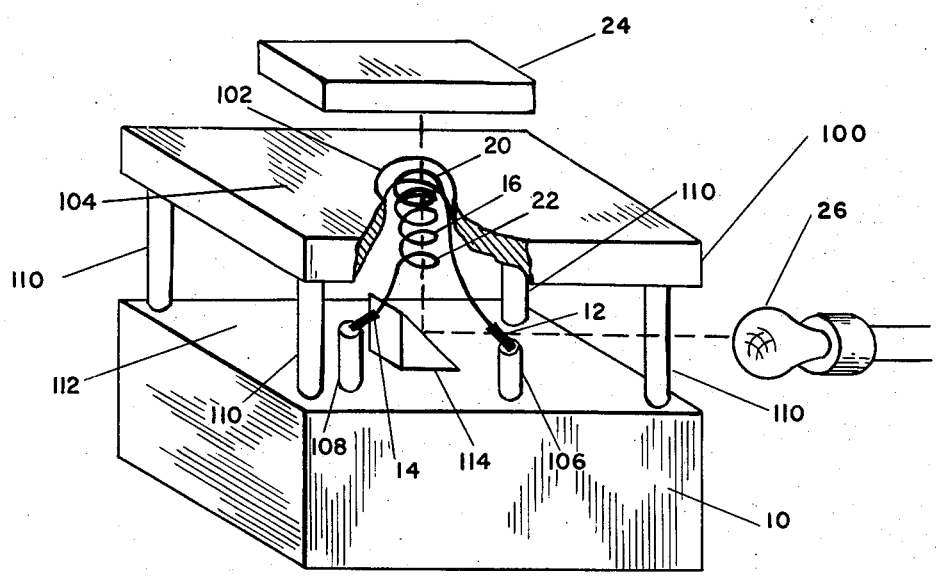

My invention will now be described in detail with reference to the accompanying drawing, wherein Fig. 1 illustrates an embodiment of the invention in simplified form; and Fig. 2 shows this embodiment in more detail.

Referring now to Fig. 1, there is provided a Q-meter 10 coupled by leads 12, 14 to a hollow coil 16 open at ends 20 and 22. When a portion of a semiconductor specimen 24 is moved into close proximity with end 20, the Q of the coil is changed under the influence of the semiconductor specimen. The change in Q values then is proportional to the electrical conductivity of the semiconductor portion and, by suitably calibrating the Q-meter, this conductivity can be displayed in terms of the electrical resistivity.

A light source, in this example a lamp, 26 is mounted adjacent the end 22 of the coil and is coupled through switch 28 to battery 30. The light source is arranged so that when the source is energized, light transmitted through the coil illuminates the portion of the semiconductor specimen under test. As indicated previously, the Q of the coil will attain one value when the light source is deenergized and attain a second and different value when the light source is energized. The difference between these two values is a measure of the minority carrier bulk lifetime.

Referring now to Fig. 2, there is provided an electrically non-conductive plate 100 provided with an aperture 102. The coil 16 is mounted within the aperture in such manner that end 20 is adjacent the top surface 104 of plate 102 but falls somewhat below this surface. Leads 12 and 14 connect coils ends 20 and 22 to respective terminals 106 and 108 of Q meter 10. These leads also serve to support the coil. Spacers 110 rigidly support plate 100 in spaced relation to the top surface 112 of the Q meter. A semiconductor specimen is placed on top of plate 100 in such manner that a portion thereof covers aperture 102. The light source 26 is insulatedly mounted between plate 100 and the top surface of the Q meter in such manner that when the source is energized, light emitted therefrom strikes a 45° mirror 114 and is reflected axially through the coil and strikes the semiconductor portion covering the aperture.

While I have shown and pointed out my invention as applied above, it will be apparent to those skilled in the art, that many modifications can be made within the scope and sphere of my invention as defined in the claims which follow.

What is claimed as new is:

1. A method for utilizing an electrically energized coil having a given first Q-value and a source of radiation which when energized is adapted to direct its radiation axially through said coil to measure the resistivity and minority carrier lifetime of a semiconductor specimen, said method comprising the steps of placing a portion of said specimen and one end of said coil into close proximity to change the Q of said coil to a second value, the difference between said first and second Q-values being a measure of the resistivity of said semiconductor portion; and energizing said source to illuminate said portion with incident radiation and change the Q of said coil to a third value, the difference between said second and third Q-value being a measure of the minority carrier lifetime.

2. A device for measuring the resistivity and minority carrier bulk lifetime of a semiconductor specimen, said device comprising a Q-meter; a hollow coil open at both ends and coupled to said meter, said coil having a given first Q-value; and a source of radiation adapted to be selectively energized and deenergized, radiations from said source when energized being transmitted axially through said coil, said meter, when a portion of said specimen is moved into close proximity with one end of said coil indicating a second Q-value when said source is deenergized and indicating a third Q-value when said source is energized, the difference between the first and second Q-values being a measure of the resistivity of said specimen portion, the difference between the second and third values being a measure of the minority carrier bulk lifetime of said specimen.

References Cited in the file of this patent

UNITED STATES PATENTS

| | | |
|---|---|---|
| 2,238,091 | Zuschlag | Apr. 15, 1941 |
| 2,602,838 | DeBoisblanc | July 8, 1952 |
| 2,759,146 | Heinz | Aug. 14, 1956 |
| 2,772,393 | Davis | Nov. 27, 1956 |

OTHER REFERENCES

"Method for Extending Range of Q-Meter," Electrical World, March 30, 1946, p. 78.